Figure 2:
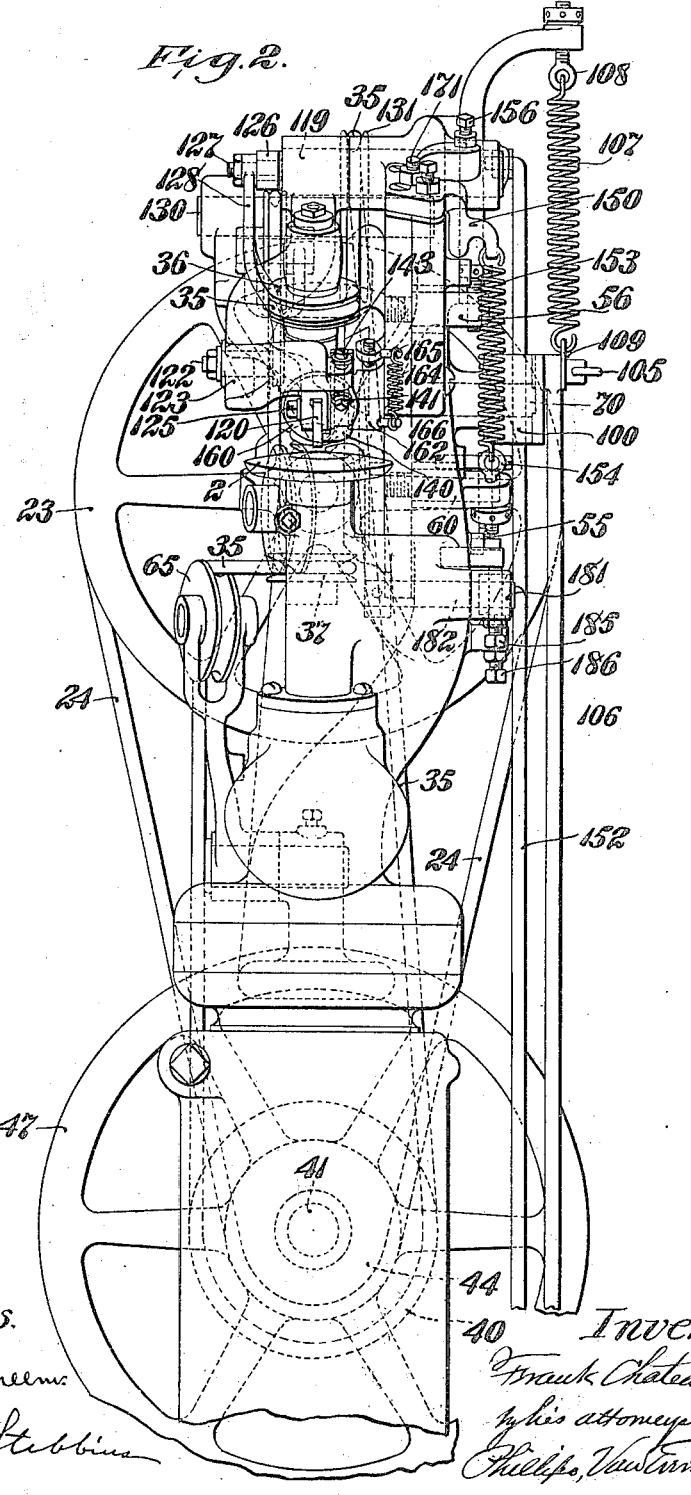

F. CHATEAUNEUF.
MACHINE FOR OPERATING UPON SHOE SOLES.
APPLICATION FILED MAY 26, 1913.
1,216,072. Patented Feb. 13, 1917.
6 SHEETS—SHEET 1.
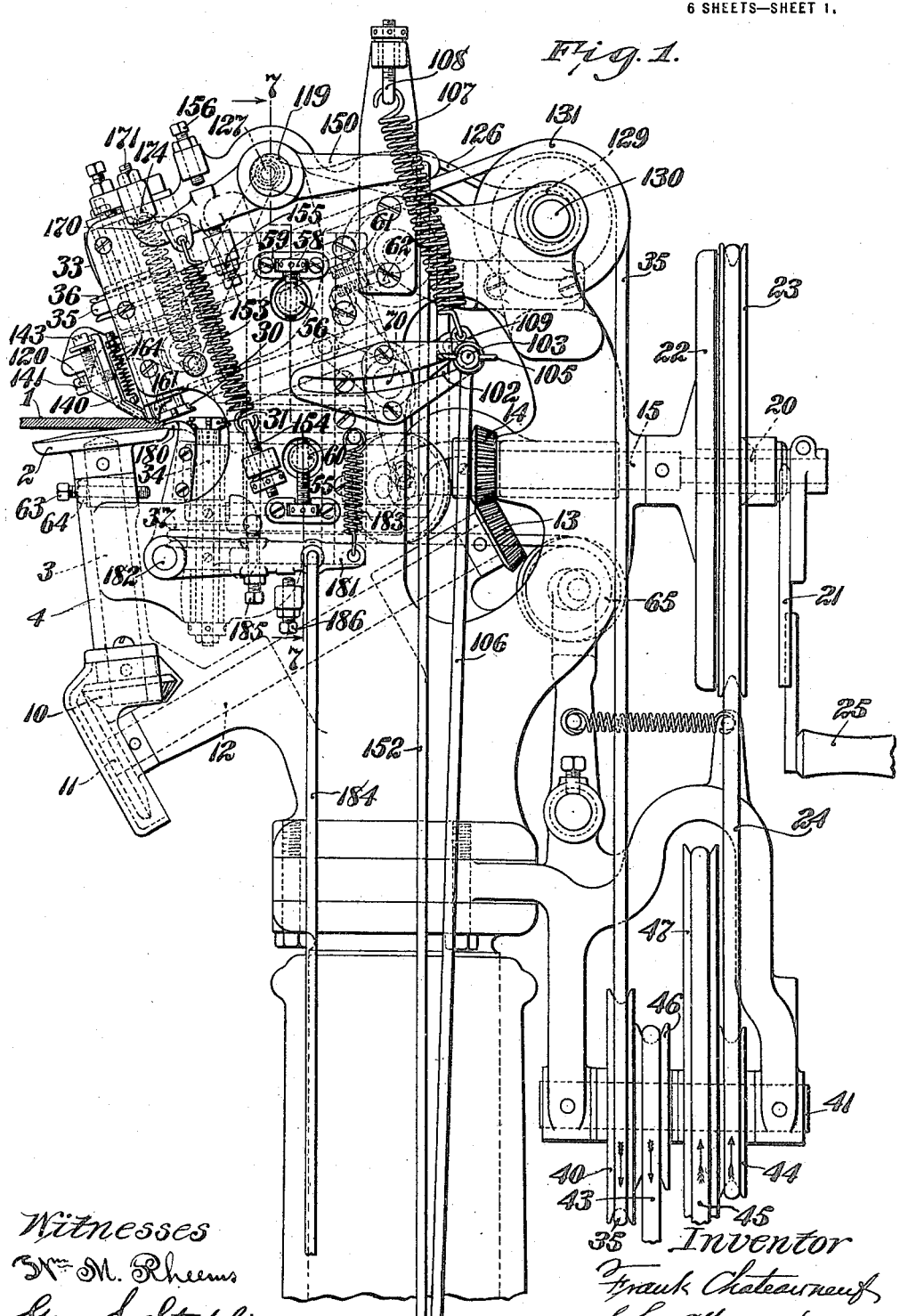
Fig. 1.
Witnesses
Wm. M. Rheems
Geo. E. Stibbins
Inventor
Frank Chateauneuf
by his attorneys

F. CHATEAUNEUF.
MACHINE FOR OPERATING UPON SHOE SOLES.
APPLICATION FILED MAY 26, 1913.

1,216,072.

Patented Feb. 13, 1917.
6 SHEETS—SHEET 2.

Witnesses.
Wm. M. Rheem.
Geo. L. Stebbins.

Inventor
Frank Chateauneuf,
by his attorneys
Phillips, Van Everen & Fish

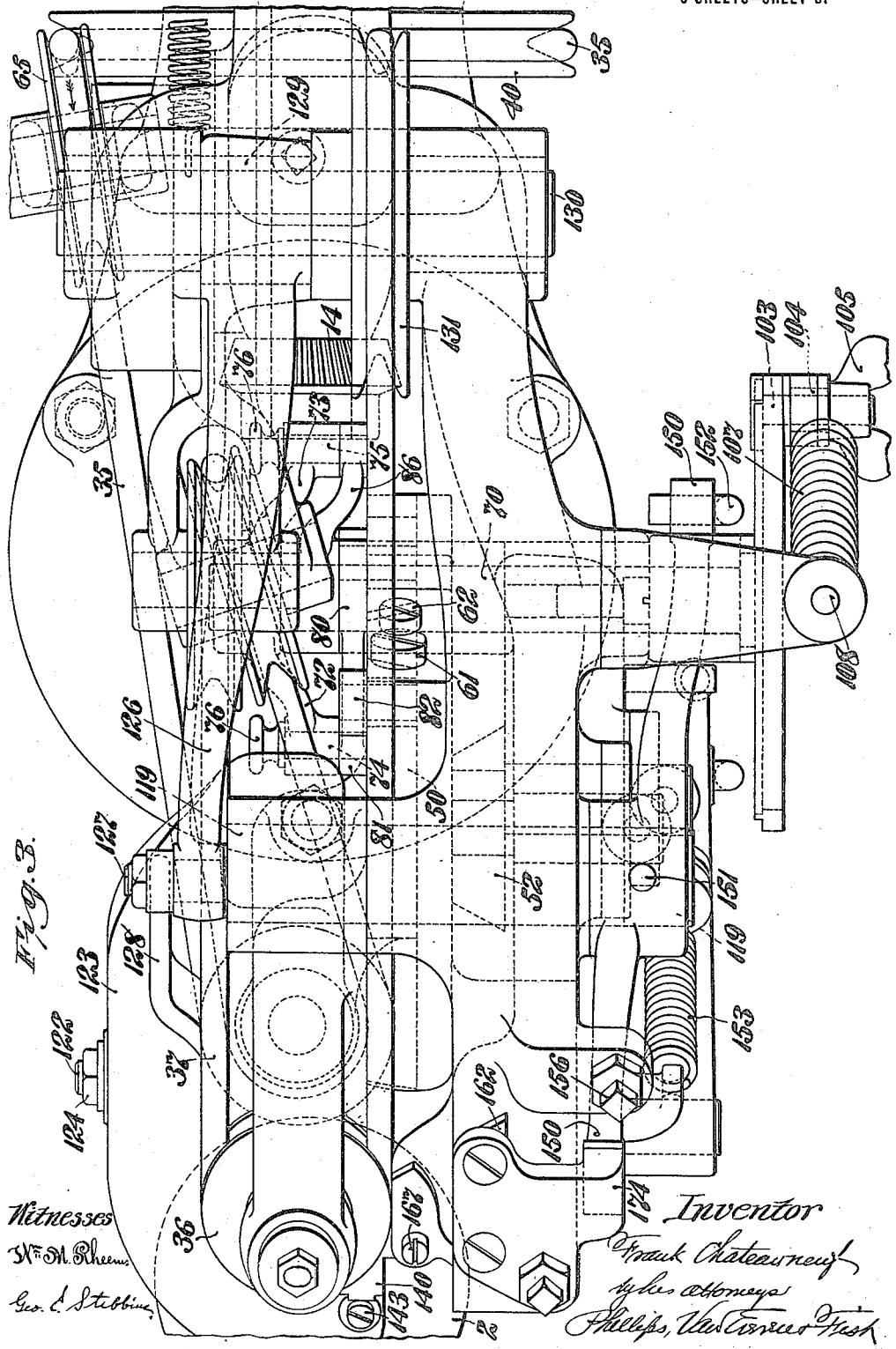

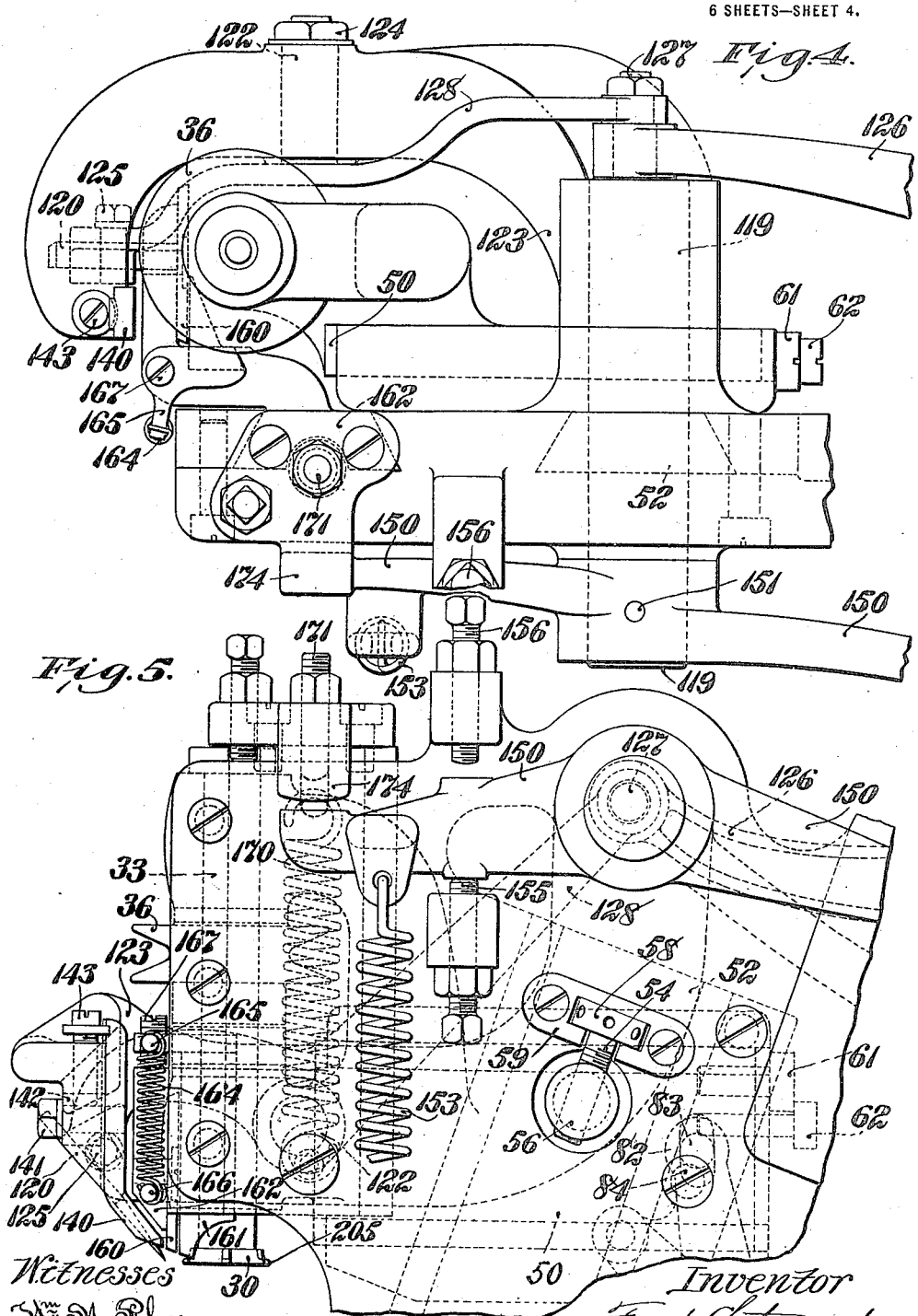

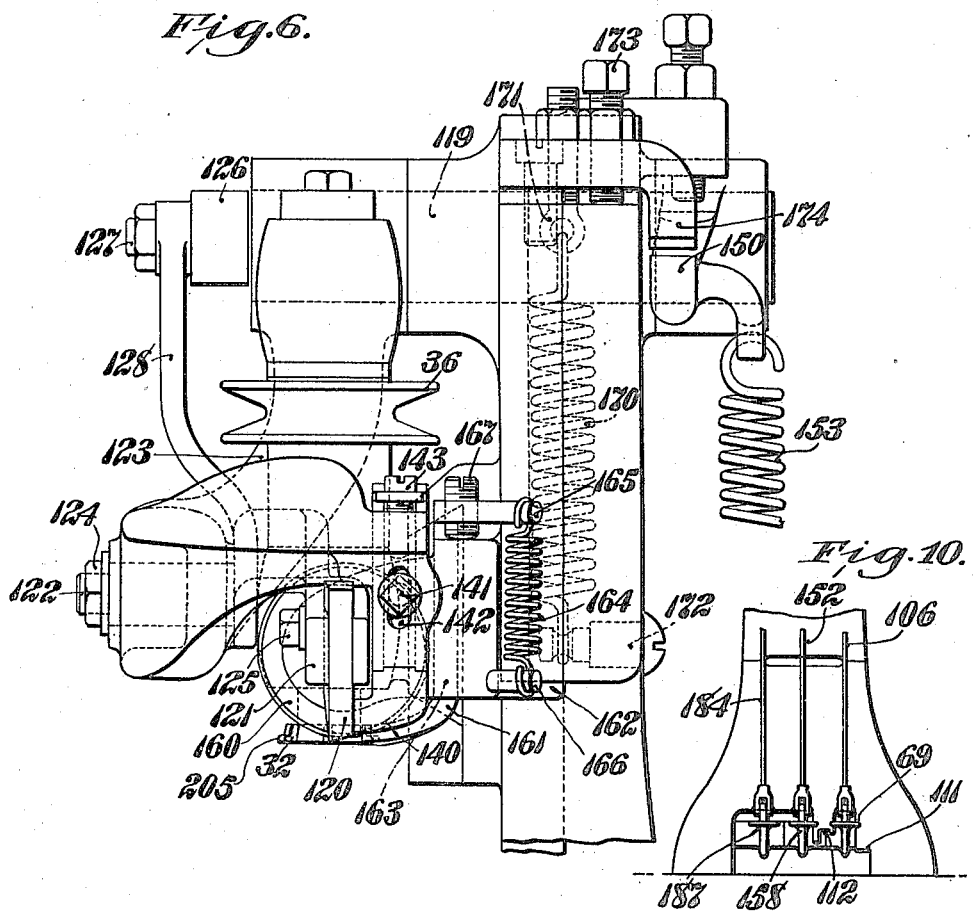

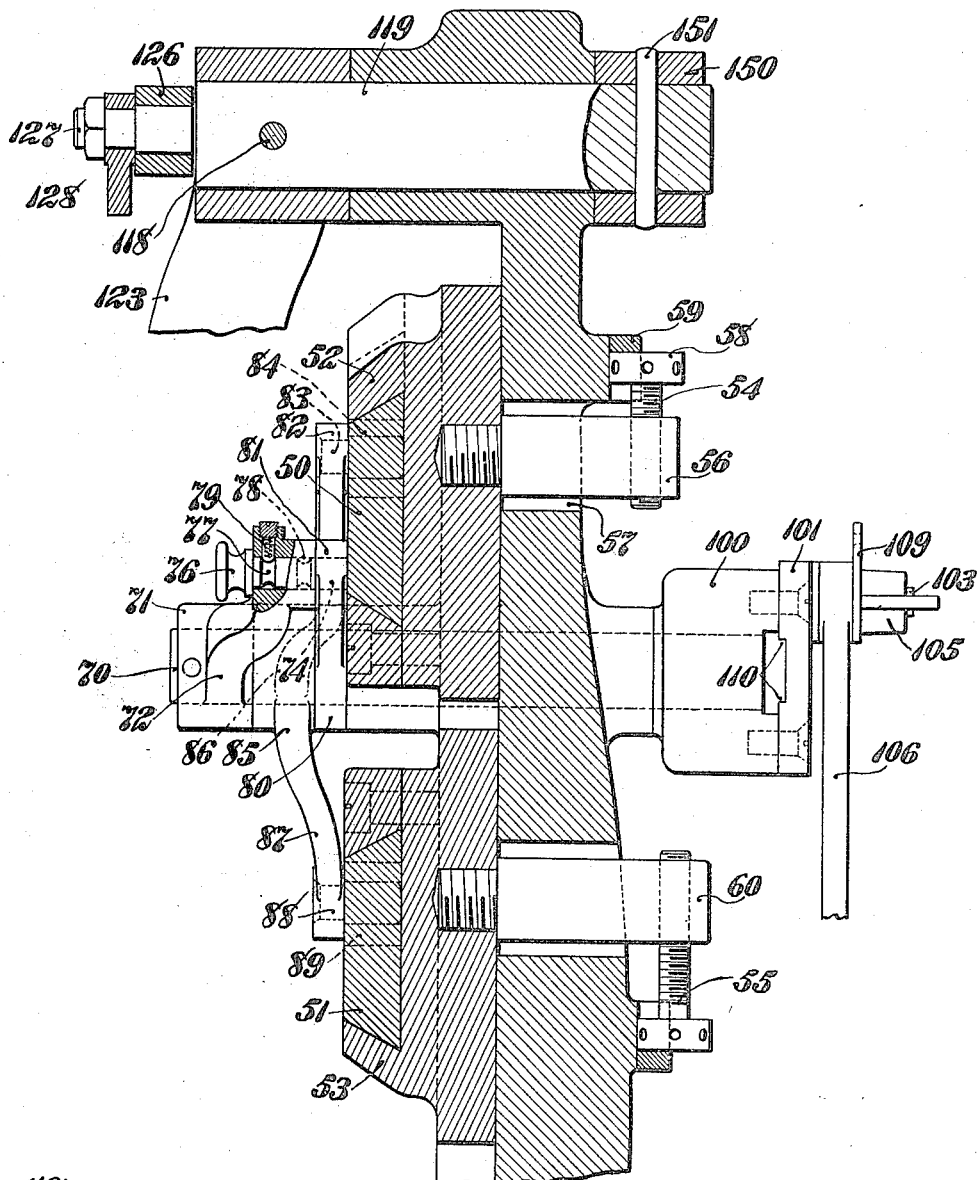

UNITED STATES PATENT OFFICE.

FRANK CHATEAUNEUF, OF HAVERHILL, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING UPON SHOE-SOLES.

1,216,072. Specification of Letters Patent. Patented Feb. 13, 1917.

Application filed May 26, 1913. Serial No. 769,879.

*To all whom it may concern:*

Be it known that I, FRANK CHATEAUNEUF, a citizen of the United States, residing at Haverhill, in the county of Essex and State of Massachusetts, have invented certain new and useful Improvements in Machines for Operating Upon Shoe-Soles; and I do hereby declare the following to be a full, clear, and exact description of the invention, such as will enable others skilled in the art to which it appertains to make and use the same.

The present invention relates to machines for operating upon shoe soles, and more particularly to a machine for shouldering the edges of shoe soles, especially turn shoe soles.

One object of the invention is to produce a machine having a plurality of shouldering knives and having mechanism for presenting the knives to the work so as to cut shoulders of different form along different parts of the edge of the sole. Another object of the invention is to provide the machine with improved mechanism for withdrawing the channeling knife from the sole. Another object of the present invention is to provide the machine with shouldering knives to form an undercut shoulder against which the upper is sewed. Other objects of the invention are to improve the construction of machines for operating upon shoe soles in certain particulars which are hereinafter described and claimed, and the advantages of which will be apparent to those skilled in the art from the following description.

With the above objects in view, the present invention consists in the machine for operating upon shoe soles hereinafter described and particularly pointed out in the claims.

In the drawings, which illustrate the preferred embodiment of the present invention, Figure 1 is a front elevation of the head of the machine; Fig. 2 is an elevation of the left side of the machine head; Fig. 3 is a plan view of the machine head; Figs. 4, 5 and 6 are a plan view, a front elevation, and a side elevation, respectively, of a portion of the machine head, all taken at a slight angle to the horizontal, and illustrating on an enlarged scale, the channeling knife, presser feet, and one of the shouldering knives; Fig. 7 is a section on the line 7—7 of Fig. 1; Figs. 8 and 9 are cross sections, taken through the fore part and shank respectively, of a turn shoe sole, shouldered and channeled by the machine; and Fig. 10 is a front elevation of the base of the pedestal showing the treadles.

In the illustrated embodiment of the present invention, the shoe sole 1, which is to be operated upon, is supported upon a rotary work table 2 which is power driven, at a speed controlled by the operator, to feed the work to the shouldering and channeling knives. The upper face of the work table 2 is either roughened or provided with an abrasive facing to insure a good grip on the grain surface of the sole to feed it. The work table 2 is carried upon the upper end of a shaft 3 which is slightly inclined to the vertical and is journaled in a projection 4 on the head of the machine. The work table 2 is slightly inclined to the horizontal so that the sole is supported upon the part of the work table next the shouldering and channeling knives. The work table 2 and shaft 3 are rotated by means of a bevel gear 10 on the lower end of the shaft 3 which meshes with a bevel gear 11 on a shaft 12 which is driven through the bevel gears 13 and 14 from a horizontal shaft 15. Upon the end of the shaft 15 is mounted a clutch 20 which is controlled by means of the hand-operated crank 21. The clutch 20 comprises a plate 22 fast upon the shaft 15 and a pulley 23 which is loose on the shaft and which is driven at a constant speed by means of a belt 24. The clutch 20 is so constructed that when the crank 21 is turned forward by the operator by means of the handle 25, the shaft 15 will be power driven at exactly the same speed that the crank 21 is turned. The operator in turning the crank 21 does not supply the power for turning the work table 2, but through the clutch 20 controls the speed at which the table 2 is power driven. The operator can thus without exertion control the feed of the work. The clutch 20 forms no part of the present invention and therefore its details of construction are not described. Clutches having a similar construction and mode of operation are shown in the patents to Stanbon, No. 500,438, June 27, 1893, and Winter, No. 981,345, January 10, 1911.

In order to shoulder the edges of shoe soles, rotary shouldering knives 30 and 31 are provided. These knives cut on the edge of the sole the shoulder against which the upper is sewed. In making a shoe sole, and more particularly a sole for a turn shoe, it is quite generally desirable to leave the edge of the sole around the fore part of nearly the same thickness as the sole, and to bevel the sole to a thin edge along the shank. This can readily be done with the two illustrated shouldering knives 30 and 31. The shouldering knife 30 cuts obliquely downward into the leather and leaves the thick edge which is desired around the fore part, while the knife 31 forms the thin beveled edge which is desired along the shank. In order that the knives 30 and 31 may operate along the fore part and around the shank respectively, they are mounted so that either one may be brought into operative position at the will of the operator. In operating upon turn shoe soles and particularly upon soles for spring heel shoes, it is often desirable to channel the heel without shouldering the edge of the heel. The shouldering knives are, therefore, mounted so as to be both withdrawn from the work to permit the channeling knife to operate alone around the heel.

The knives 30 and 31 have upon their peripheries sharp work cutting blades or teeth 32. The knives 30 and 31 are mounted upon the ends of the knife carrying spindles 33 and 34 respectively. These spindles are driven by a belt 35 which passes around driving pulleys 36 and 37 carried by the spindles 33 and 34 respectively. The belt 35 is driven from a pulley 40 loosely mounted on a shaft 41 at the right and below the head of the machine. The pulley 40 is driven by a second pulley 46 which is formed integrally with the pulley 40 and which is, in turn, driven by a belt 43 coming from a pulley (not shown) at the base of the machine. The pulley 44 which drives the belt 24 is also mounted upon the shaft 41 and is driven from a pulley 47 which is formed integrally with the pulley 44 and which, in turn, is driven by the belt 45 coming from a pulley (not shown) at the base of the machine. The speed of the belts 43 and 45 and the comparative size of the pulleys 40 and 44 is such that the belt 35 is driven much faster than the belt 24, so that the knives 30 and 31 rotate very rapidly in comparison to the speed of feeding the work by the rotary work table 2. The pulleys 40 and 44 are driven in opposite directions, the direction of movement of the belts being indicated by arrows in Fig. 1. As is evident from the direction of movement of the belts, the edges of the shouldering knives 30 and 31 which engage the sole move in an opposite direction to the feed of the sole, and cut against the feed of the work.

The knife carrying spindles 33 and 34 are carried respectively by slides 50 and 51. The slides 50 and 51 are mounted to reciprocate at an angle to each other so that the paths in which the knives 30 and 31 are bodily moved to and from the work intersect at the edge of the sole. When the knife 30 is advanced, the knife 31 is retracted horizontally to the right. When the knife 31 is advanced, the knife 30 is retracted to the right and upwardly out of the path of the knife 31. The slides 50 and 51 are dovetailed, as shown in Fig. 7, and are slidably mounted in slides 52 and 53 respectively, which are dove-tailed in the machine frame and which may be adjusted vertically by means of adjusting screws 54 and 55 respectively. The screw 54 is threaded in a pin 56 which extends from the vertical slide 52 through a hole 57 in the machine frame, and is provided with a capstan head 58 which is received in a slotted plate 59 screwed to the frame of the machine. The screw 54 affords a nice adjustment for vertically positioning the knife 30 relatively to the work table 2 so that the thickness of the edge or feather at the margin of the sole may be varied. The adjusting screw 55 is similarly threaded in a pin 60 projecting from the slide 53 to provide a nice vertical adjustment for the knife 31. A stop screw 61 is threaded in the end of the slide 50. The head of the screw 61 contacts with an abutment on the vertical slide 52 and limits the movement of the slide 50 to the left. The screw 61 thus provides a nice adjustment for varying the position to which the shouldering knife 30 is advanced over the work table 2. A lock screw 62 is threaded in the slide 50 beside the adjusting screw 61. The head of the lock screw 62 is forced against the top of the head of the adjusting screw 61 and thus securely holds it from becoming loosened. The movement of the slide 51 to the left is limited by means of a stop screw 63 threaded in the machine frame, and locked in adjusted position by a lock nut 64. The adjustable stop screw 63 thus furnishes a nice adjustment to vary the distance that the shouldering knife 31 is advanced over the work table 2. It is to be noted that the belt 35 is lead to and from the pulleys 36 and 37 in a direction parallel to the direction of movement of the slides 50 and 51. Therefore, when one slide is advanced, the extra length of belting required for its pulley will be given up by the pulley on the other slide which is retracted simultaneously with the advance of the first slide. A belt tightener 65 keeps the belt 35 at the proper tension.

In order that the knife carrying slides 50 and 51 may be reciprocated to alternately present the knives 30 and 31 to the work at the will of the operator, or to withdraw both of the knives from the work, the slides 50 and 51 are connected to a rock shaft 70 which is journaled in the machine frame and which is rocked by means of a treadle 69 at the base of the machine. On the rear end of the rock shaft 70 is pinned a hub 71 from which project two arms 72 and 73. In the ends of the arms 72 and 73 are slidingly mounted pins 74 and 75 which normally project forwardly from the arms 72 and 73. The pins are provided with handles 76 which may be grasped to slidingly move the pins. In each of the pins are round-bottomed annular grooves 77 and 78 which are engaged by a spring-pressed plunger 79 which holds the pin either advanced or retracted. A lever 80 is loosely mounted on the rock shaft 70 and has two arms 81 and 82. The arm 81 is approximately parallel with the arm 72 and has at its end a circular hole in which the projecting end of the pin 74 fits. The arm 82 is longer and more nearly vertical than the arm 81 and carries at its end a pin 83 which is engaged in a slot 84 on the slide 50. The motion of the rock shaft 70 is transmitted by the lever 72 through the connecting pin 74 to the arm 81 of the lever 80, and from the other arm 82 of the lever 80 through the pin 83 and slot 84 connection to the slide 50. A second lever 85 is loosely mounted on the shaft 70 and has two arms, one of which 86 extends parallel with the arm 73, the other of which 87 extends downwardly. The end of the arm 86 has through it a hole for receiving the pin 75 which is carried upon the end of the arm 73. The downwardly extending arm 87 bears a pin 88 which is received in a slot 89 in the slide 51. The motion of the rock shaft 70 is transmitted by the arm 73 through the pin 75 to the arm 86 of the lever 85, and from the arm 87 of the lever 85 through the pin 88 and slot 89 connection to the slide 51. These connections are such that when the shaft 70 is rocked in one direction, one slide is advanced to present its shouldering knife to the work, and the other slide is simultaneously retracted from the work. Either of the slides 50 and 51 can be disconnected from the rock shaft 70 at any time by pulling out the pins 74 and 75 to disconnect the arms 72 and 73 from the arms 81 and 86 respectively. The slides are thus disconnected when it is desired to remove or replace one of the shouldering knives. When one of the shouldering knives is to be removed, the slide carrying the other knife is disconnected and retracted to the right to permit the first knife to be removed from its carrying spindle.

On the forward end of the rock shaft 70 is fixed a hub 100 upon the front of which is screwed a plate 101. The plate 101 has a curved slot 102 through which is received a square-headed bolt 103. The slot 102 is countersunk at the back of the plate to leave square shoulders 110 which hold the square head of the bolt from rotation. The bolt 103 is surrounded by a sleeve 104 against the end of which bears a wing nut 105 which is threaded on the end of the bolt 103. The wing nut 105, acting through the sleeve 104, clamps the bolt tightly in place. The bolt can thus be shifted to either end of the slot 102 and clamped there. A treadle rod 106, which is drawn downward by the treadle 69, has an eye at its upper end which fits loosely over the sleeve 104 on the bolt 103. An extension spring 107 is connected between an adjustable screw 108 at the top of the machine head and a plate 109 which is loosely carried on the sleeve 104. The spring 107 normally holds the treadle rod 106 elevated and through the rock shaft 70 holds one of the shouldering knives 30 and 31 in operative position. With the parts in the positions illustrated in the drawings, the treadle 69 and treadle rod 106 are elevated by the spring 107 and the shouldering knife 30 is presented in operative position, but when the treadle is depressed to its full extent, the shouldering knife 30 will be retracted and the shouldering knife 31 brought into operative position. As above pointed out, the bolt 103 can be shifted to either end of the slot 102 so that either one of the knives 30 and 31 is normally advanced. When the machine is to be used, the bolt 103 is shifted in the slot 102 to present the shouldering knife which is to be first brought into operation to shoulder the sole. The treadle 69 is swiveled so that it can be thrown either to the right or left by the foot of the operator. Downwardly facing retaining shoulders 111 and 112 are provided at the right and left of the treadle arm for holding the treadle fully or half depressed. The operator, by swinging the treadle to the right, can bring it beneath the shoulder 111 and so lock one of the shouldering knives advanced against the tension of the spring 107. When the treadle is half depressed, one shouldering knife will be half retracted, and the other shouldering knife half advanced, and neither of the shouldering knives will be in operative position. The operator, by swinging the treadle 69 to the left, can lock the treadle against the force of the spring 107 in its half depressed position with both of the knives retracted into inoperative position. For example, if the heel of the sole is to be channeled, but not shouldered, the treadle 69 is positioned under the shoulder 112 to free the work of both shouldering knives.

The stitch-receiving channel in the sole is cut by means of a channeling knife 120. The channeling knife 120 is mounted in a knife carrier 121. The knife carrier 121 is pivotally mounted upon a support 123 which, in turn, is pivotally mounted upon the machine frame. The knife carrier 121 is pivotally mounted upon the support 123 by means of a stud 122 which projects from the knife carrier 121 and is journaled in the support 123. The end of the stud 122 is threaded to receive a holding nut 124. The support 123 is pivotally mounted upon the machine frame by means of a shaft 119 which is journaled in the machine frame and upon which the support 123 is secured by means of a pin 118. The knife 120 extends substantially tangential to circles struck about the axis of the stud 122 and the axis of the shaft 119 which form the pivotal mountings of the knife carrier 121 and the support 123 respectively, so that not only is the knife 120 rapidly reciprocated longitudinally to cut the channel in the sole during the operation of the machine, but is withdrawn longitudinally from the channel when the knife carrier support 123 is raised by the operator to free the knife from the channel.

The support 123 is turned about the axis of its mounting shaft 119 by means of a lever 150 which is secured by means of the pin 151 to the end of the shaft 119. The lever 150 is turned by means of a treadle rod 152 which can be drawn down by the operator by means of a treadle 158 at the base of the machine. A spring 153 is connected between the left hand end of the lever 150 and an adjusting screw eye 154 on the machine frame and acts to turn the lever 150 to yieldingly hold the presser foot 140 against the work. Adjusting stop screws 155 and 156 limit the movement of the lever 150 under the action of the spring 153 and the treadle 158, and through the connecting shaft 119 limit the movement of the presser foot toward and from the work table 2. The knife 120 is adjustably held in a knife-receiving groove in the end of the knife carrier 121 by means of a clamping screw 125. A short and rapid longitudinal reciprocatory movement is imparted to the knife 120 so that it easily cuts the channel as the sole is fed past it. In order to reciprocate the channeling knife, a reciprocating link 126 is pivotally connected at 127 to the upwardly extending arm 128 of the knife carrier 121. The pivotal connection 127 is approximately concentric with the shaft 119 by means of which the support 123 is mounted on the machine frame, so that when the knife carrier support 123 is raised by the operator, the arm 128 turns idly about its pivotal connection 127 so as not to interfere with the movement of the knife carrier support 123. The other end of the link 126 surrounds an eccentric 129 on a horizontal shaft 130. The shaft 130 has a pulley wheel 131 over which passes the rapidly running belt 35. The reciprocatory motion imparted to the link 126 by the eccentric 129 oscillates the knife carrier 121 and reciprocates the knife 120.

The depth of the cut of the channeling knife may be varied by means of a presser foot 140 which bears upon the sole in advance of the knife 120. The presser foot 140 is clamped on the front of the support 123 by means of a clamping screw 141 threaded in the presser foot 140 and passing through a slot 142 in the support 123. An adjustable screw 143 having a flanged head engaging a notch in the top of the presser foot 140 affords means for vertically adjusting the presser foot.

The edge of the sole is held against the work table 2 by means of a yieldingly mounted roll 160 and a second presser foot 161. The roll 160 bears against the between substance in about the same position along the line of feed as the shouldering and channeling knives, and the presser foot 161 engages the edge in advance of the shouldering knives. The roll 160 is mounted in a rearward projection on the lower end of a slide 162 which is slidably mounted on the machine frame. The presser foot 161 is formed by the off set lower end of a slide 163 which is in turn slidably mounted on the slide 162. The presser foot 161 is yieldingly held against the work by means of a spring 164 connected to a pin 165 on the slide 163 and a pin 166 on the slide 162. An adjusting screw 167 limits the movement of the presser foot 161 under the action of the spring 164. The slide 162 which carries the roll 160 is drawn toward the work by means of a spring 170 which is connected between an adjustable screw eye 171 carried upon the upper end of the slide 162 and a pin 172 upon the machine frame. The movement of the slide 162 under the action of its spring 170 is limited by means of a stop screw 173 carried by the slide 162 and engages the machine frame. The slide 162 is lifted to raise the roll 160 by means of the treadle-operated lever 150, the end of which engages the projection 174 extending from the top of the slide 162. When the treadle is depressed to raise the presser foot 140 and channeling knife 120, the lever 150 engages the projection 174 and raises the slide 162 which carries the roll 160. The adjusting screw 167 which is carried by the slide 163 is engaged by the raised slide 162 so that the presser foot 161 is also lifted when the treadle is depressed. When the treadle 158 is depressed, the channeling knife 120 is withdrawn and the presser foot 140 raised, then the roll 160 is lifted, and lastly, the presser foot 161 is lifted.

The sole is positioned laterally on the work table by means of an edge gage 180 which projects over the edge of the work table. The edge gage 180 is mounted on the end of a bell crank lever 181 pivotally mounted at 182 on the machine frame. The edge gage is yieldingly held in position by means of a spring 183 which is connected between the horizontal arm of the bell crank lever and the machine frame. The edge gage can be moved to the right against the force of the spring 183 by means of a treadle rod 184 connected to the horizontal arm of the bell crank lever and adapted to be depressed by a treadle 187 at the base of the machine frame. Adjusting screws 185 and 186 limit the movement of the edge gage under the action of the spring 183 and the treadle 187. The edge gage is normally positioned, as illustrated in Fig. 1, so that the channeling and shouldering knives operate a predetermined distance from the edge of the sole. It is sometimes desirable to have the channel farther in from the edge of the sole, as, for example, along the outside of the fore part to form an extension edge, around the toe when a heavy toe counter is to be used, or around the heel for a spring heel shoe. When it is desired to have the channeling and shouldering knives operate farther from the edge of the sole, the treadle 187 is depressed, moving the edge gage 180 to the right so that the channeling and shouldering knives may operate farther in from the edge of the sole. While the machine of the present invention can be used for shouldering insoles for welt shoes, it is, nevertheless, particularly adapted for operating upon turn shoe soles. The operation of the machine will be explained by describing its operation upon a turn shoe sole, the fore part of which is to have a thick edge and the shank a thin edge, and the heel of which is to be channeled but not shouldered. The treadle 158 is depressed to raise the channeling knife and presser feet and the sole is placed upon the work table with the portion of the shank next the heel presented to the knives. The operator depresses the treadle 69 half way, and throws it under the locking shoulder 112 to hold both of the shouldering knives 30 and 31 out of engagement with the sole. The operator turns the crank 21 to feed the sole and cause the channeling knife 120 to channel the heel. If the operator desires to have the channel around the heel located farther in from the margin than it is located around the rest of the sole, he depresses the treadle 187 to retract the edge gage 180 and permit the sole to be positioned farther to the right beneath the channeling knife 120 while the channeling knife is operating around the heel. After the heel is channeled and the shank is reached, the operator depresses the treadle 69 to bring the shouldering knife 31 into operative position. The shouldering knife 31 and the channeling knife operate along the shank until the fore part is reached, whereupon the operator releases the treadle 69 and permits the shouldering knife 30 to come into operative position. The shouldering knife 30 and the channeling knife operate around the fore part until the opposite side of the shank is reached, whereupon the operator again depresses the treadle 69 to bring the shouldering knife 31 against the shank. When the starting point is reached, the operator stops turning the crank 21 and depresses the treadle 158 to free the work of the presser feet and channeling knife, and the finished sole is removed.

Cross sections of the fore part and shank of a turn shoe sole prepared by the illustrated machine are shown in Figs. 8 and 9. The channeling knife 120 cuts a channel 200 in the flesh side of the sole opening inwardly or toward the middle of the sole to receive the line of stitches which pass through the between substance 201 and unite the sole and upper. On the outer side of the between substance is the outwardly facing shoulder 202 against which the shoe upper is sewed. This shoulder is undercut at its base with a round-bottomed groove 203 opposite the bottom of the channel 200, leaving an overhanging tongue 204 at the top of the shoulder. Before the upper is sewed to the sole, the feather 206, which extends outwardly beyond the tongue 204 to form the margin of the sole, is bent toward the grain side of the sole by means of the sole edge molding machine, so that the groove 203 is spread open to receive the inseam stitching. The shoe upper and the two-thread side of the chain stitch, which is generally used for the inseam, are drawn by the setting of the stitches into the groove 203. After the upper is sewed to the sole and the inseam trimmed and the shoe turned and beaten out, the tongue 204 extends out over the inseam-receiving groove 203 and the inside of the shoe sole is much smoother over the inseam than would be the case if the shoulder were not undercut. The groove 203 is cut by the rounded projections or nibs 205 on the blades of the shouldering knives. Above the projections 205, the edges of the blades are straight to cut a straight face on the tongue 204 which forms the overhanging part of the shoulder. The straight face on the end of the tongue 204 prevents a ragged or irregular tongue edge. Below the projections 205, the edges of the blades are straight for cutting the straight inclined upper face of the feather 206. The knife 30, which operates around the fore part, has the straight feather cutting portion of the blades inclined downwardly to the sole, so that, as shown in Fig. 8, the upper face of the feather 206 extends outwardly in a direction inclined upwardly or away from the grain side of the sole and the edge or margin of the sole is approximately as thick as the sole. The knife 31, which operates along the shank, has the straight feather cutting portion of its blades inclined upwardly to the edge of the sole so, as shown in Fig. 9, the upper face of the feather 206 extends outwardly in a direction inclined downwardly or toward the grain side of the sole and the edge or margin of the feather is beveled to a thin edge. The sole, therefore, has the comparatively thick edge along the fore part and the beveled edge along the shank which conduces to an attractive appearence in the finished shoe.

While the preferred embodiment of the present invention has been specifically illustrated and described, the present invention is not limited to its preferred embodiment, but may be embodied in other constructions within the scope of the invention as set forth in the following claims:—

1. A machine for shouldering the edges of shoe soles having, in combination, means for feeding and guiding the sole, two shouldering knives for operating along different portions of the sole edge, knife carriers and mechanism connected therewith for normally presenting one knife in position to operate upon the edge of the sole, and means for withdrawing the first knife and for presenting the second knife in position to operate upon the edge of the sole.

2. A machine for shouldering the edges of shoe soles having, in combination, means for feeding and guiding the sole, two shouldering knives for operating along different portions of the sole edge, knife carriers and mechanism connected therewith including a spring for normally presenting one knife in position to operate on the edge of the sole, and a treadle for moving the knife carriers against the force of the spring to withdraw the first knife and present the second knife in position to operate upon the edge of the sole.

3. A machine for shouldering the edges of shoe soles having, in combination, means for feeding and guiding the sole, two shouldering knives for operating along different portions of the sole edge, mounted to bodily reciprocate along inclined paths which intersect at or near the edge of the sole being shouldered, and means for withdrawing one knife from the edge of the sole and advancing the other knife into position to operate upon the edge of the sole.

4. A machine for shouldering the edges of shoe soles having, in combination, means for feeding and guiding the sole, two rotary shouldering knives for operating along different portions of the sole edge, knife carrying slides for supporting the shouldering knives to bodily reciprocate along inclined paths which intersect at or near the edge of the sole being shouldered, and means for retracting one knife carrying slide and simultaneously advancing the other knife carrying slide so as to present the shouldering knives singly and alternately in position to operate upon the edge of the sole.

5. A machine for shouldering the edges of shoe soles having, in combination, means for feeding and guiding the sole, two rotary shouldering knives for operating along different portions of the sole edge, rotary spindles for supporting the knives, driving pulleys mounted on the spindles, carriers in which the spindles are journaled, means for retracting one carrier and simultaneously advancing the other carrier, a driving belt running over the pulleys, and pulley wheels for guiding the belt to the knife spindle pulleys so that the increased length of the belt required by the advancing spindle pulley is given up by the retracting spindle pulley.

6. A machine for shouldering the edges of shoe soles having, in combination, means for feeding and guiding the sole, a plurality of shouldering knives for operating along different portions of the sole edge, and means for presenting the knives singly in position to operate upon the edge of the sole and for withdrawing all the knives from the edge of the sole.

7. A machine for shouldering the edges of shoe soles having, in combination, means for feeding and guiding the sole, two shouldering knives, and means for withdrawing one knife from the edge of the sole and advancing the other knife into position to operate upon the edge of the sole, said means having provision for holding both knives out of engagement with the edge of the sole.

8. A machine for shouldering the edges of shoe soles having, in combination, means for feeding and guiding the sole, two rotary shouldering knives for operating along different portions of the sole edge, knife carrying slides for supporting the shouldering knives, and means for retracting one knife carrying slide and simultaneously advancing the other knife carrying slide so as to present the shouldering knives singly and alternately in position to operate upon the edge of the sole, said means having provision for arresting the knife carrying slides each in a half-advanced position and out of contact with the edge of the sole.

9. A machine for shouldering the edges of shoe soles having, in combination, a table for supporting a flat sole, means for feeding the sole, two shouldering knives for operating along different portions of the sole edge on the side of the sole opposite the side on the table, and means for alternately presenting the shouldering knives in position to operate upon different portions of the sole edge.

10. A machine for shouldering the edges of shoe soles having, in combination, a rotatable table for supporting the sole, means to rotate the table to feed the sole, a plurality of shouldering knives for operating along different portions of the sole edge, and means for presenting the knives singly in position to operate upon different portions of the sole edge.

11. A machine for shouldering the edges of shoe soles having, in combination, means for feeding and guiding the sole, a plurality of shouldering knives for operating along different portions of the sole edge, and means for withdrawing a knife from the sole and simultaneously advancing another knife into position to continue the shouldering operation along the edge of the sole.

12. A machine for shouldering the edges of shoe soles having, in combination, means for feeding and guiding the sole, two shouldering knives for operating along different portions of the sole edge, means for positioning the shouldering knives having provision for normally presenting either knife to the sole and manually operable means for withdrawing this knife and advancing the other knife.

13. A machine for shouldering the edges of shoe soles having, in combination, means for feeding and guiding the sole, two shouldering knives for operating along different portions of the sole edge, mechanism connecting the two knives for causing the knives to move in opposite directions toward and from the work, a spring, means for connecting the spring to said connecting mechanism so as to cause either one of the knives to be normally advanced, and manually operable means for withdrawing the normally advanced knife and advancing the other knife.

14. A machine for operating upon shoe soles having, in combination, means for feeding and guiding the sole, a channeling knife, a knife carrier, means acting through the knife carrier to reciprocate the knife longitudinally to cut a channel in the sole, a support for the knife carrier having a pivotal mounting on the machine frame, the channeling knife extending substantially tangential to an arc struck about the axis of the pivotal mounting of the support, and manually operable means for turning the support about its pivotal mounting to withdraw the channeling knife longitudinally from the channel cut in the sole.

15. A machine for operating upon shoe soles having, in combination, means for feeding and guiding the sole, a channeling knife, a pivotally mounted knife carrier, a support upon which the knife carrier is pivotally mounted and which in turn has a pivotal mounting upon the machine frame, the channeling knife extending substantially tangential to an arc struck about the axis of the pivotal mounting of the support, means for oscillating the knife carrier to longitudinally reciprocate the knife to cut a channel in the sole having a pivotal connection with the knife carrier approximately concentric with the pivotal mounting of the support, and manually operable means for turning the support upon its pivotal mounting to withdraw the channeling knife longitudinally from the channel cut in the sole.

16. A machine for operating upon shoe soles having, in combination, means for feeding and guiding the sole, a channeling knife, a knife carrier, a support upon which the knife carrier is pivotally mounted and which in turn has a pivotal mounting upon the machine frame, the channeling knife extending substantially tangential to an arc struck about the axis of the pivotal mounting of the support, means for oscillating the knife carrier to longitudinally reciprocate the knife to cut a channel in the sole, and manually operable means for turning the support about its pivotal mounting to withdraw the knife longitudinally from the channel cut in the sole.

17. A machine for operating upon shoe soles having, in combination, means for feeding and guiding the sole, a channeling knife, a knife carrier, a support upon which the knife carrier is pivotally mounted, means for oscillating the knife carrier to reciprocate the knife longitudinally to cut a channel in the sole, and manually operable means for moving the support to bodily move the knife carrier and withdraw the knife longitudinally from the channel cut the sole.

18. A machine for shouldering the edges of shoe soles having, in combination, means for feeding and guiding the sole, a rotary shouldering knife for forming an undercut outwardly facing shoulder on the sole, said rotary knife being mounted on an axis to position the plane of rotation of the knife substantially parallel to or at an acute angle with the face of the sole, and means for rotating the knife.

19. A machine for shouldering the edges of shoe soles having, in combination, means for feeding and guiding the sole, a rotary shouldering knife for cutting an outwardly facing shoulder against which the upper is sewed having a projecting portion for undercutting the base of the outwardly facing shoulder, and means for driving the rotary knife.

20. A machine for shouldering the edges of shoe soles having, in combination, means for feeding and guiding the sole, a rotary shouldering knife having a straight edge for cutting the upper part of an outwardly facing shoulder on the sole, having a straight edge for cutting a feather on the margin of the sole, and having a projecting edge at the angle between said straight portions for undercutting the base of the shoulder, and means for driving the rotary knife.

21. A machine for shouldering the edges of shoe soles having, in combination, means for feeding and guiding the sole, a plurality of independently mounted shouldering knives for operating along different portions of the sole edge, a channeling knife for cutting a channel opposite the shoulder knife cut, and means under the control of the operator for normally presenting a shoulder knife in position to operate upon the edge of the sole and for withdrawing such knife and presenting another shoulder knife in position to operate upon a different portion of the edge of the sole.

22. A machine for shouldering the edges of shoe soles having, in combination, means for feeding and guiding the sole, and a shouldering knife having a straight edge for cutting the upper part of an outwardly facing shoulder on the sole, having a straight edge for cutting a feather on the margin of the sole and having a projecting nib at the angle between said straight edges for cutting a groove at the base of the shoulder.

FRANK CHATEAUNEUF.

Witnesses:
Geo. E. Stebbins,
Miriam Clement.

Copies of this patent may be obtained for five cents each, by addressing the "Commissioner of Patents, Washington, D. C."

Correction in Letters Patent No. 1,216,072.

It is hereby certified that in Letters Patent No. 1,216,072, granted February 13, 1917, upon the application of Frank Chateauneuf, of Haverhill, Massachusetts, for an improvement in "Machines for Operating Upon Shoe-Soles," an error appears in the printed specification requiring correction as follows: Page 7, line 98, claim 17, after the word "cut" insert the word *in;* and that the said Letters Patent should be read with this correction therein that the same may conform to the record of the case in the Patent Office.

Signed and sealed this 20th day of March, A. D., 1917.

[SEAL.]
F. W. H. CLAY,
*Acting Commissioner of Patents.*

Cl. 12—37.